US007735125B1

(12) United States Patent
Alvarez et al.

(10) Patent No.: US 7,735,125 B1
(45) Date of Patent: Jun. 8, 2010

(54) SYSTEMS AND METHODS FOR IDENTIFYING AND VERIFYING A USER OF A KIOSK USING AN EXTERNAL VERIFICATION SYSTEM

(75) Inventors: David R. Alvarez, San Carlos, CA (US); Mitchell A. Shapiro, San Francisco, CA (US); James V. Elliott, Roswell, GA (US)

(73) Assignee: Nexxo Financial, Inc., San Bruno, CA (US)

( * ) Notice: Subject to any disclaimer, the term of this patent is extended or adjusted under 35 U.S.C. 154(b) by 1636 days.

(21) Appl. No.: 10/966,496

(22) Filed: Oct. 15, 2004

Related U.S. Application Data

(60) Provisional application No. 60/512,290, filed on Oct. 17, 2003.

(51) Int. Cl.
 *G06F 15/16* (2006.01)
(52) U.S. Cl. .............................. 726/9; 726/20; 713/159; 713/172; 705/67; 705/76; 902/4; 902/5; 902/18
(58) Field of Classification Search ...................... 726/9, 726/20; 713/159, 172, 186; 705/65, 67, 705/72, 76; 725/9, 20; 902/3, 4, 5, 18, 25
See application file for complete search history.

(56) References Cited

U.S. PATENT DOCUMENTS

| 5,350,906 | A | 9/1994 | Brody et al. |
| 5,440,108 | A | 8/1995 | Tran et al. |
| 5,649,118 | A | 7/1997 | Carlisle et al. |
| 5,686,713 | A | 11/1997 | Rivera |
| 5,864,830 | A | 1/1999 | Armetta et al. |
| 5,897,625 | A | 4/1999 | Gustin et al. |

(Continued)

FOREIGN PATENT DOCUMENTS

FR 002790128 A1 8/2000

(Continued)

OTHER PUBLICATIONS

U.S. Appl. No. 10/966,925, David R. Alvarez, Systems and Methods for Generating Revenue from Multi-Card Money Sharing, filed Oct. 15, 2004.

(Continued)

*Primary Examiner*—Matthew B Smithers
*Assistant Examiner*—Paul Callahan
(74) *Attorney, Agent, or Firm*—Carr & Ferrell LLP

(57) ABSTRACT

The invention includes systems and methods for identifying and verifying the identity of a user of a kiosk using an external verification system. The kiosk receives customer input data that indicates the identity of the user of the kiosk. The kiosk generates an identification query that includes at least some customer input data. The kiosk transmits the identification query to an external verification system. The kiosk receives a verification response from the external verification system. The kiosk then processes the verification response to verify the identity of the user of the kiosk. These systems and methods advantageously provide identification and verification of the identity of a user of a kiosk. With sufficient identification and verification, financial institutions can comply with government regulations designed to reduce the opportunity for money laundering, terrorism, fraud, and identity theft while offering users of kiosks a wider range of financial services.

36 Claims, 5 Drawing Sheets

U.S. PATENT DOCUMENTS

| | | | |
|---|---|---|---|
| 5,937,396 | A | 8/1999 | Konya |
| 5,940,811 | A | 8/1999 | Norris |
| 5,949,046 | A | 9/1999 | Kenneth et al. |
| 5,963,647 | A | 10/1999 | Downing et al. |
| 6,012,048 | A | 1/2000 | Gustin et al. |
| 6,044,360 | A | 3/2000 | Picciallo |
| 6,105,009 | A | 8/2000 | Cuervo |
| 6,129,275 | A | 10/2000 | Urquhart et al. |
| 6,141,438 | A * | 10/2000 | Blanchester ............... 382/140 |
| 6,298,336 | B1 | 10/2001 | Davis et al. |
| 6,327,573 | B1 | 12/2001 | Walker et al. |
| 6,467,684 | B2 | 10/2002 | Fite et al. |
| 6,473,500 | B1 | 10/2002 | Risafi et al. |
| 6,575,362 | B1 | 6/2003 | Bator et al. |
| 6,578,761 | B1 | 6/2003 | Spector |
| 6,598,794 | B1 | 7/2003 | Ishii |
| 6,609,113 | B1 | 8/2003 | O'Leary et al. |
| 6,619,545 | B2 | 9/2003 | Harris |
| 6,636,833 | B1 | 10/2003 | Flitcroft et al. |
| 6,659,259 | B2 | 12/2003 | Knox et al. |
| 6,758,394 | B2 * | 7/2004 | Maskatiya et al. .......... 235/379 |
| 6,999,569 | B2 | 2/2006 | Risafi et al. |
| 2001/0011680 | A1 | 8/2001 | Soltesz et al. |
| 2001/0013018 | A1 | 8/2001 | Awano |
| 2001/0042784 | A1 | 11/2001 | Fite et al. |
| 2001/0054019 | A1 | 12/2001 | de Fabrega |
| 2002/0091937 | A1 * | 7/2002 | Ortiz ........................ 713/200 |
| 2002/0179401 | A1 | 12/2002 | Knox et al. |
| 2002/0198806 | A1 | 12/2002 | Blagg et al. |
| 2003/0024979 | A1 | 2/2003 | Hansen et al. |
| 2003/0046249 | A1 | 3/2003 | Wu |
| 2003/0080185 | A1 | 5/2003 | Werther |
| 2003/0105714 | A1 | 6/2003 | Alarcon-Luther et al. |
| 2003/0200180 | A1 * | 10/2003 | Phelan et al. ................. 705/65 |
| 2003/0218062 | A1 | 11/2003 | Noriega et al. |
| 2004/0007618 | A1 | 1/2004 | Oram et al. |
| 2004/0059953 | A1 * | 3/2004 | Purnell ....................... 713/202 |
| 2004/0091136 | A1 * | 5/2004 | Dombrowski ............... 382/115 |
| 2005/0269415 | A1 | 12/2005 | Licciardello et al. |
| 2006/0032911 | A1 | 2/2006 | Arias |
| 2006/0037835 | A1 | 2/2006 | Doran et al. |
| 2006/0064379 | A1 | 3/2006 | Doran et al. |
| 2006/0069642 | A1 | 3/2006 | Doran et al. |

FOREIGN PATENT DOCUMENTS

| | | |
|---|---|---|
| WO | WO 96/36936 | 11/1996 |
| WO | WO 97/10562 | 3/1997 |

OTHER PUBLICATIONS

U.S. Appl. No. 10/966,958, David R. Alvarez, Systems and Methods for Money Sharing, filed Oct. 15, 2004.

U.S. Appl. No. 10/966,497, David R. Alvarez, Systems and Methods for Generating Revenue from Banking Transactions Using a Stored-Value Card, filed Oct. 15, 2004.

U.S. Appl. No. 10/966,299, James V. Elliott, Systems and Methods for Biometric Identification and Verification of a User of a Kiosk, filed Oct. 15, 2004.

U.S. Appl. No. 10/966,496, David R. Alvarez, Systems and Methods for Identifying and Verifying a User of a Kiosk Using an External Verification System, filed Oct. 15, 2004.

U.S. Appl. No. 11/657,425, David R. Alvarez, Self-Service Money Remittance with an Access Card, filed Jan. 23, 2007.

U.S. Appl. No. 10/966,879, David R. Alvarez, Systems and Methods for Banking Transactions Using a Stored-Value Card, filed Oct. 15, 2004.

* cited by examiner

SYSTEMS AND METHODS FOR IDENTIFYING AND VERIFYING A USER OF A KIOSK USING AN EXTERNAL VERIFICATION SYSTEM

CROSS-REFERENCE TO RELATED APPLICATIONS

This application claims the benefit of U.S. Provisional Application No. 60/512,290, filed Oct. 17, 2003, entitled "Systems and Methods for Money Sharing," which is hereby incorporated by reference.

BACKGROUND

1. Field of the Invention

The present invention relates to financial services, and more particularly, to systems and methods for identifying and verifying a user of a kiosk using an external verification system.

2. Description of the Prior Art

Remote access to financial services, such as banking transactions, has become ubiquitous. However, customers continue to be required to personally visit a bank and/or complete extensive forms in order to obtain a traditional bank account or a credit card prior to being able to gain remote access to financial services. The bank is required to identify and verify the customer's identity prior to account creation in order to comply with government regulations designed to prevent illegal activities such as money laundering and funding for terrorism. An example of such government regulations includes the USA Patriot Act of 2001. In one example, a customer's identity and account information is checked against a government database that comprises a list of suspected individuals and accounts involved in money laundering. In another example, the customer's identity is checked against a government database of known and suspected terrorists. It is also necessary for the bank to verify the customer's identity in order to reduce fraud and challenge identity theft.

Automatic teller machines (or ATM machines) allow a customer to conduct only a limited number of financial transactions because ATM machines lack the ability to initially obtain the identity of and subsequently verify the identities of their users. Once the bank satisfies government regulations, which require identification and verification of the identity of the customer, the bank may open a customer account and issue a debit card with an associated coded key, or Personal Identification Number (PIN). Once the debit card and the proper PIN number are provided to an ATM machine, regardless of the actual identity of the user, access to accounts and services is granted. Although current ATM machines include video cameras, these cameras are typically used to provide security and do not verify identity.

In one prior art solution provided by 7-Eleven, a VCOM kiosk provides banking transactions such as money transfer, printing checks, and check cashing based on a deposited amount. However, prior to the completion of any banking transactions, the customer must interact with a cashier so that the cashier may properly identify and verify the identity of the customer. Also, the card associated with the VCOM kiosk is only used for identification purposes. Other kiosks manufactured by Blackstone issue cards, but the cards are calling cards.

In other prior art solutions, Coinstar, a kiosk maker, and Next Estate, a card issuer, offer their customers a kiosk-based service where a customer may indicate their desire to obtain a card. Once the customer receives a receipt from the kiosk, an agent calls the customer to identify the customer and verify their identity. A card is then sent to the customer through the mail.

Some companies offer stored-value cards for goods and services. Typically, however, companies do not verify the identity of their stored-value card customers because the stored-value cards generally hold less than a few hundred dollars and are not covered by the government regulations concerning customer identification and verification. Furthermore, consumer purchases with stored-value cards are generally limited to simple goods and services such as bagels, books, coffee, copies, and gifts.

SUMMARY OF INVENTION

The invention addresses the above problems by providing systems and methods for identification and verification of a user of a kiosk that provides financial services. The kiosk receives customer input data that indicates the identity of the user of the kiosk. The kiosk generates an identification query that includes at least some of the customer input data. The kiosk transmits the identification query to an external verification system. The kiosk receives a verification response from the external verification system. The kiosk then processes the verification response to verify the identity of the user of the kiosk.

In some embodiments, the kiosk receives customer input data that comprises customer account information. In some embodiments, the kiosk receives customer input data that comprises customer account information from a card. In some embodiments, the verification response comprises a customer record and the kiosk processes the verification response by comparing the customer record to the customer input data to verify the identity of the user of the kiosk. In some embodiments, the verification response comprises a verification result and the kiosk determines verification of the identity of the user of the kiosk based on the verification result. In some embodiments, the external verification system receives the identification query from the kiosk, processes the identification query to generate a verification response for identifying the user of the kiosk, and transmits the verification response back to the kiosk.

These systems and methods advantageously provide identification and verification of the identity of a user of a kiosk that provides financial services. Sufficient identification and verification allow financial institutions to comply with government regulations designed to reduce the opportunity for money laundering and terrorism while avoiding fraud and identity theft. Government regulations include those regulations which prohibit the providing of financial services without sufficient customer identification and verification. Further, government regulations also require that customer identification be compared against various government databases containing the names of potential criminals and terrorists. With sufficient identification and verification, financial institutions may offer users of kiosks a wider range of previously unavailable financial services such as account creation and the issuance of stored-value cards, debit cards, and credit cards with reduced risk of fraud losses.

DETAILED DESCRIPTION OF THE INVENTION

Figure 1:
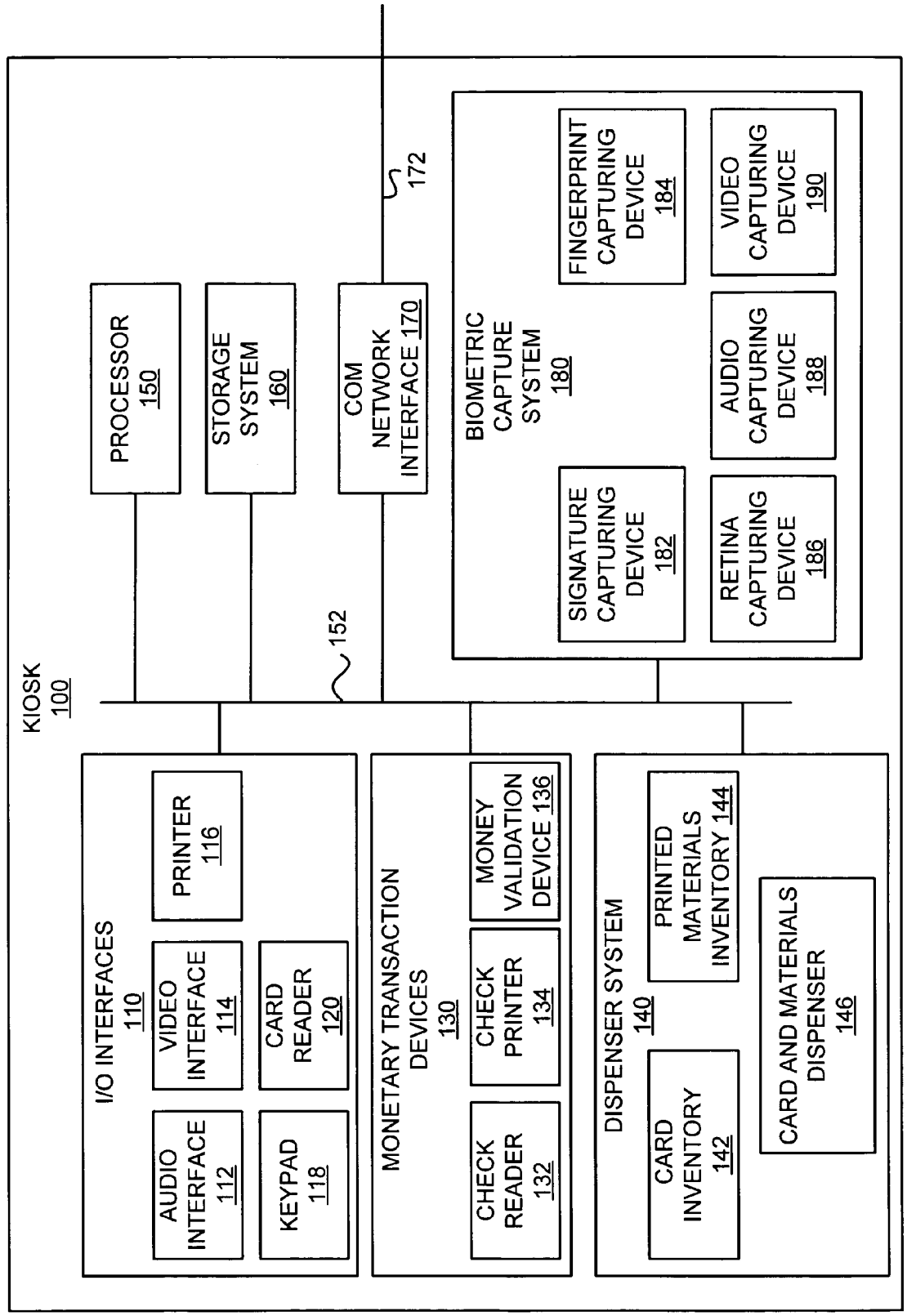
FIG. 1 is a block diagram of a kiosk in an exemplary implementation of the invention.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

Although remote access to accounts and financial services has become commonplace, customers are still required to personally visit a financial institution or provide an abundance of personal information through the mail in order to obtain a demand deposit account (DDA account), credit card, debit card. These actions are required by financial institutions in order to initially identify and subsequently verify the identity of the customer.

Remote verification of an identity of a user of a kiosk may provide both transactional authentication and security without the necessity of face-to-face contact or lengthy identity verification through the postal system. Identification is accomplished by capturing customer input data. Customer input data is any information that the kiosk receives that indicates the customer's identity. Some examples of customer input data include customer account information and biometric data. Customer input data is any information that the kiosk receives that indicates the customer's identity. Some examples of customer input data include customer account information and biometric data. Customer account information may include, without limitation, one or any combination of the following: an account number, a name, a date of birth, a place of birth, a local address, a Social Security number, a tax identification number, or a Matricula Consular card number. Biometric data is any information related to the customer's physiological characteristics that indicates the customer's identity. Verification confirms the identity of an individual by comparing the customer input data with previously recorded user data. In an example, identification is accomplished through capturing an image of a fingerprint of an individual.

In an example, verification is accomplished by confirming the identity of the user through matching the customer input data against previously recorded user data such as a customer record. A customer record is at least some customer input data that has been previously collected and is maintained on an external verification system. An external verification system is any system external to the kiosk that, based on an identification query, can verify or assist in verifying the identity of the user of the kiosk. Once the identification query is processed, the external verification system generates a verification response and transmits the verification response to the kiosk. An external verification system may be owned or operated by a private organization, a government organization, or both. An example of an external verification system may include a card transaction processing system, a government database, or a member bank system.

An identification query is any signal, message, or instruction that indicates a request for verification of the identity of the user of the kiosk. The identification query may comprise at least some customer input data and a request for a customer record, or, alternately, at least some customer input data and a request that the external verification system process and provide a direct verification of the user's identity. A verification response is any signal, message, or instruction that indicates a response from an external verification system that indicates an identity of a user of a kiosk.

One example of a government regulation requiring verification is the USA Patriot Act of 2001, through the application of 31 CFR §103.121, which provides two options for verifying the identity of a customer within specific circumstances: non-documentary verification and documentary verification. Documentary verification is the verification of the identity of a user through documents typically provided by the user including, but not limited to, driver's licenses, state-issued ID cards, military ID cards, Matricula Consular cards, passports and alien registration cards. Non-documentary verification is used when users are unable to satisfy documentary requirements or as an additional verification step. This approach involves comparisons of separately obtained information to that which the user provided. For example, the user's home address can be compared to address(es) appearing on the credit report.

In another example of identification, customer input data may be obtained that includes documents such as a driver's license or Social Security number. A software program that executes a validation algorithm may check the documents to establish the probability of each document's validity. For example, a driver's license from a particular state may require a specific combination of numbers and letters. If the software probability program reviews the customer input data and determines that there are an incorrect combination of numbers and letters, then verification may be denied. If the software probability program determines that all of the customer input data is most likely valid, the customer input data may be directed to the verification process and subsequently checked against a government database.

Identification and remote verification may provide equal, if not better, safeguards than both face-to-face meetings and written verification. In some embodiments, methods such as signature, fingerprint, retina, audio, and image analysis can be far more accurate and less subjective than simple visual recognition of a customer based on a driver's license that may be years old. In some embodiments, documentary verification may be performed by comparing a user's image to a scanned photograph from the user's state-issued ID card. Simultaneously, non-documentary verification may be conducted by comparing the user's account information from their stored-value card to a credit report located within a remote verification system. Remote identification and verification may allow the customer ease of access while providing financial institutions safeguards against fraud and identity theft.

In some embodiments, remote verification may allow financial institutions to meet government regulations by verifying the identity of a customer against government or third-party databases in order to reduce the opportunity for terrorism or money laundering. An example of applicable government regulations that may be satisfied through comparing a user's identity against a government database includes Title III of the USA Patriot Act, entitled "International Money Laundering Abatement and Antiterrorist Financing Act of 2001." Further, in some embodiments, remote verification may also allow financial institutions to reduce fraud and identity theft.

FIG. 1 is a block diagram of a kiosk 100 in an exemplary implementation of the invention. The kiosk 100 is any unattended mechanism, device, or system that is designed for public access and provides users access to accounts or financial services. The kiosk 100 includes a system bus 152 coupled with input/output (I/O) interfaces 110, monetary transaction devices 130, a dispenser system 140, a processor 150, a storage system 160, a communications network interface 170, and a biometric capture system 180. The communications network interface 170 is also coupled to an external communication link 172.

The I/O interfaces 110 are any interfaces or devices configured to provide input or output to a user of the kiosk 100. In one embodiment, the I/O interfaces 110 include an audio interface 112, a video interface 114, a printer 116, a keypad 118, and a card reader 120. The I/O interfaces 110 may also include a telephone, IP phone or teleconference device with which a user may interact with either the kiosk or a remotely located human agent. The audio interface 112 is any device or system configured to aurally interact with the user of the kiosk 100. Some examples of the audio interface 112 are speakers and a microphone. The video interface 114 is any device or system configured to visually interact with the user of the kiosk 100. An example of the video interface 114 is a touchscreen display. The printer 116 is a printer configured to print transaction records. The keypad 118 is a standard numeric or alpha-numeric device to input data into the kiosk 100. The card reader 120 is a conventional card reader configured to read ATM, stored-value, debit, charge, credit, and/or identification cards. In other embodiments, the card reader 120 may be a reader that optically, magnetically, or electrically scans cards.

The monetary transaction devices 130 are any mechanisms, devices, or systems configured to receive or provide monetary instruments of any kind such as checks, drafts, money orders, and currency. In one embodiment, the monetary transaction devices 130 include a check reader 132, a check printer 134, and a money validation device 136. The check reader 132 is a reader configured to read and validate checks, drafts, money orders, or other financial instruments. The check printer 134 is a printer configured to print checks, drafts, money orders, or other financial instruments. The money validation device 136 is a conventional device configured to accept and validate currency such as bills or coins.

The dispenser system 140 is any device or system configured to dispense cards or printed materials related to financial services, and statement information required by government regulations. In one embodiment, the dispenser system 140 includes a card inventory 142, a printed materials inventory 144, and a card and materials dispenser 146.

The biometric capture system 180 is any mechanism, device, or system configured to capture biometric information from a user of the kiosk 100. In one embodiment, the biometric capture system 180 includes a signature capturing device 182, a fingerprint capturing device 184, a retina capturing device 186, an audio capturing device 188, and a video capturing device 190. The signature capturing device 182 is a device that scans and transmits an image of a signature of the user of the kiosk 100. An example of the signature capturing device 182 is a signature scanner. The fingerprint capturing device 184 is a device that scans and transmits an image of a fingerprint of the user of the kiosk 100. An example of the fingerprint capturing device 184 is a fingerprint scanner. The retina capturing device 186 is a device that scans and transmits an image of an eye of the user of the kiosk 100. An example of the retina capturing device 186 is an eye scanner. The audio capturing device 188 is a device that records an audio sample of the user of the kiosk 100. An example of the audio capturing device 188 is a microphone. The video capturing device 190 is a device that captures a video image of the user of the kiosk 100. An example of the video capturing device 190 is a video camera.

The processor 150 is configured to execute software or instructions in accord with the operations below. The storage system 160 is any storage device, memory, or group of storage devices configured to store data permanently or temporarily. The communications network interface 170 is any communication interface configured to transfer data between any components connected to the bus 152 and any communication network.

Figure 2:
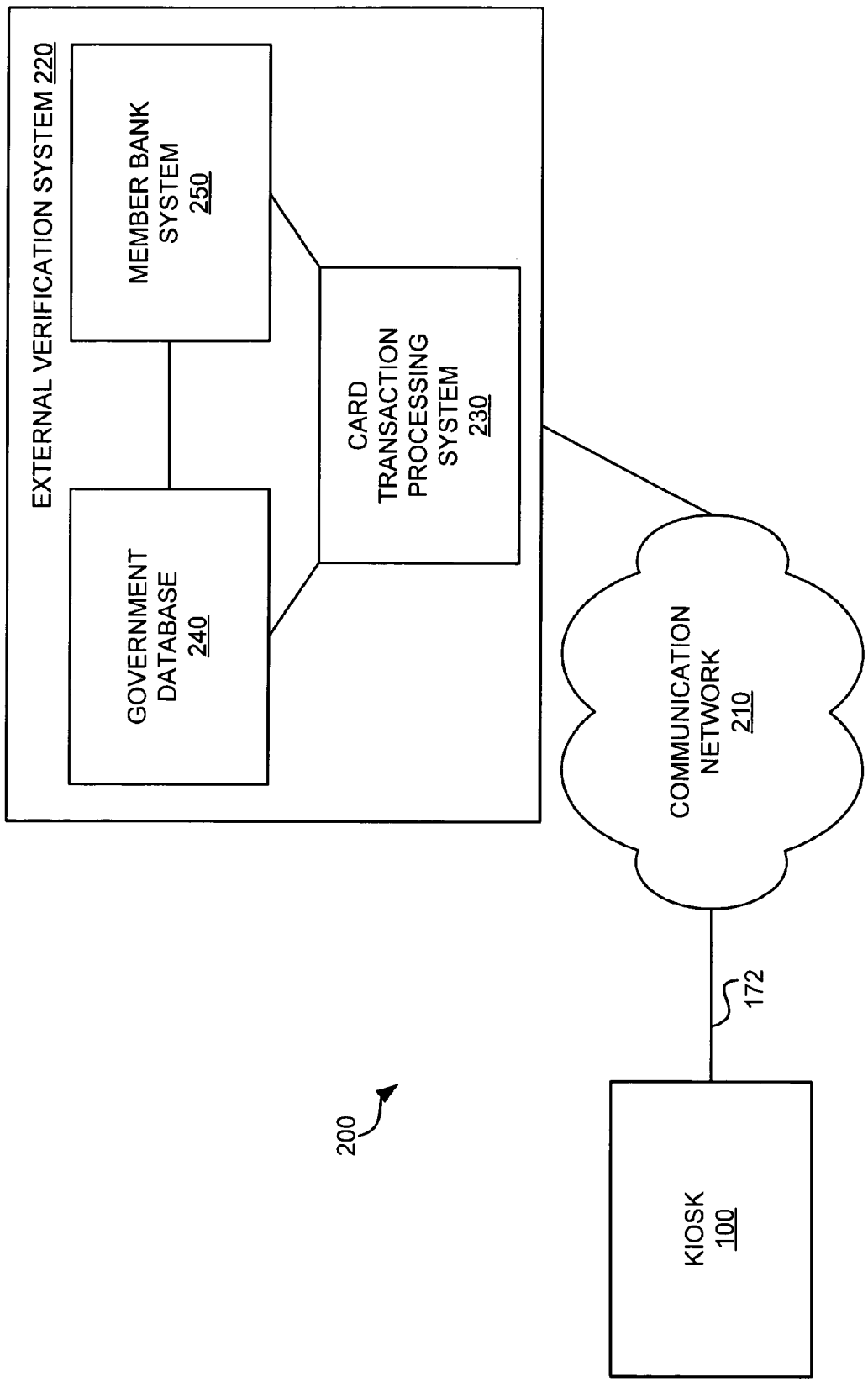
FIG. 2 is a block diagram depicting a system for identifying and verifying an identity in an exemplary implementation of the invention.

FIG. 2 is a block diagram of a system 200 for identification and verification of the identity of the user of the kiosk in an exemplary implementation of the invention. The system 200 for identification and verification includes a kiosk 100, a communication network 210, and an external verification system 220. The external verification system 220 comprises a card transaction processing system 230, a government database 240 and a member bank system 250. The kiosk 100 is coupled to the communication network 210 via the communication link 172.

The communication network 210 is any conventional communication network configured to transfer data or information related to transactions for card processing and financial transactions. In one embodiment, the communication network 210 includes a supernetwork configured to manage a couple of sub-networks. Some of these sub-networks handle financial communications for managing transactions, deposits, withdrawals, and balance checks.

The external verification system 220 is any system external to the kiosk 100 that, based on an identification query, can verify or assist in verifying the identity of the user of the kiosk 100. In one embodiment, the external verification system 220 includes a card transaction processing system 230 which is coupled to a government database 240 and a member bank system 250. In another embodiment, the government database 240 is also coupled to the member bank system 250.

The card transaction processing system 230 is any system configured to process card transactions. In one embodiment, a company called TSYS operates the card transaction processing system 230. In another embodiment, the card transaction processing system 230 may include a call center staffed with human agents who verify the identity of the user of the kiosk 100. In an example, the kiosk 100 may capture an image of the user of the kiosk through the video interface 114. The kiosk 100 may then capture an image from the driver's license of the user from the card reader 120. Both images may be transmitted over the communication network 210 to an external verification system 220 where a human agent at a call center visually compares the image of the user of the kiosk 100 with the image from the user's driver's license to verify the user's identity. In another example, the card transaction processing system 230 can be any external software program capable of comparing customer input data with previously recorded user data.

The government database 240 is any database that contains government information for individual identification for security and/or law enforcement. Some examples of government information are fingerprints, voice samples, photo identification, Social Security numbers, personal data, and customer account information. In some embodiments, the government database 240 is used to check against known terrorist or other government mandated lists before activating a card or allowing account access. In other embodiments, the government database 240, or a third-party database, assures compliance with applicable regulations, and in real time if necessary. In an example, the government database 240 can be used to notify the government of the time, place, and amount of each transaction aw well as any suspicious account activity. Reporting suspicious account activity may be required to satisfy government regulations including 31 USC §5318 and the USA Patriot Act of 2001. The member bank system 250 is a conventional banking system for processing financial transactions.

The operation of the kiosk 100 will be discussed in greater detail below in FIGS. 3-5. For the sake of simplicity, only one kiosk 100 is shown in FIG. 2. Those skilled in the art will understand that there may be numerous kiosks attached to the communication network 210. Similarly, for the sake of simplicity, only one card transaction processing system 230, government database 240 and member bank system 250 is shown in FIG. 2. Those skilled in the art will understand that there may be numerous transaction processing systems 230, government databases 240 and member bank systems 250 within the external verification system 220.

Figure 3:
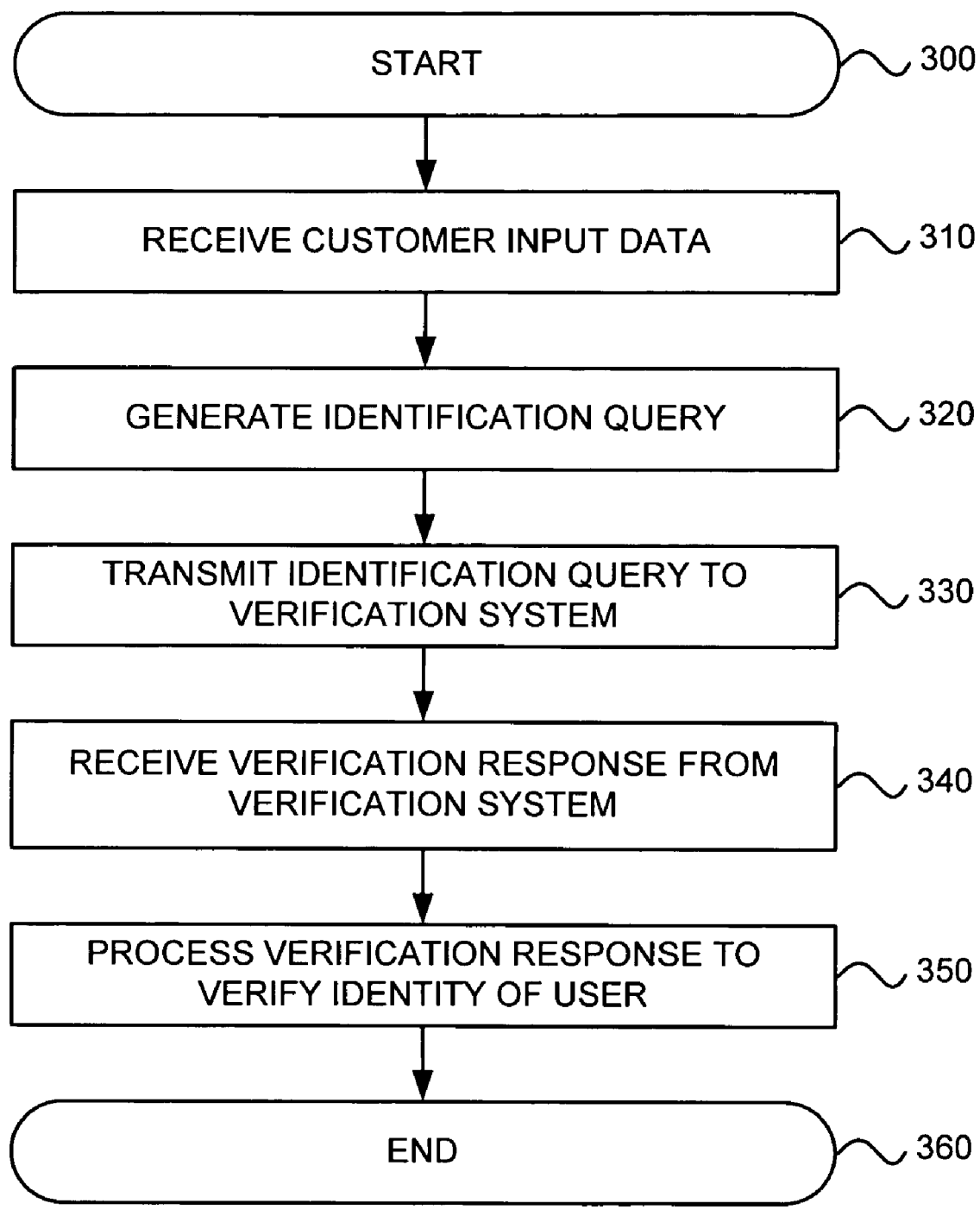
FIG. 3 is a flowchart for identifying and verifying an identity of a user of a kiosk in an exemplary implementation of the invention.

FIG. 3 is a flow chart for identifying and verifying an identity of a user of a kiosk in an exemplary implementation of the invention. FIG. 3 begins in step 300. In step 310, the kiosk 100 receives customer input data. An example of the kiosk 100 receiving customer input data includes the processor 150 directing the I/O interfaces 110 to receive customer account information. In this example, the I/O interfaces 110 may receive customer input data through one or a combination of the following: the audio interface 112, the video interface 114, or the keypad 118. In another example, the kiosk 100 receiving customer input data includes the processor 150 directing the card reader 120 to read an identification card and receive customer input data. An identification card is any card, such as a driver's license, debit card, charge card, credit card, or stored-value card, which contains information that identifies the user of the kiosk and the user's customer account information. In another example of the kiosk 100 receiving customer input data, the kiosk 100 receives customer account information from the I/O interfaces 110 while the biometric capture system 180 receives biometric data. In this example, the biometric capture system 180 may receive the biometric data component of the customer input data through one or a combination of the following: the signature capturing device 182, the fingerprint capturing device 184, the retina capturing device 186, the audio capturing device 188, or the video capturing device 190. In another example, customer input data may be retrieved from the storage system 160.

In step 320, the kiosk 100 generates an identification query. In step 330, the kiosk 100 transmits the identification query to the external verification system 220. In a further embodiment, the kiosk 100 may transmit the identification query through the communications network interface 170 and over the external communication link 172 to the external verification system 220.

In step 340, the kiosk 100 receives a verification response from the external verification system 220. The verification response may comprise a customer record or a verification result.

In step 350, the kiosk 100 verifies the identity of the user. In one example, the verification of the identity of the user of the kiosk 100 is based on the comparison of the customer input data with the customer record which was received from the external verification system 220. In a further embodiment, the verification of the identity of the user is based upon the verification result which was received from the external verification system 220. FIG. 3 ends in step 360.

Figure 4:
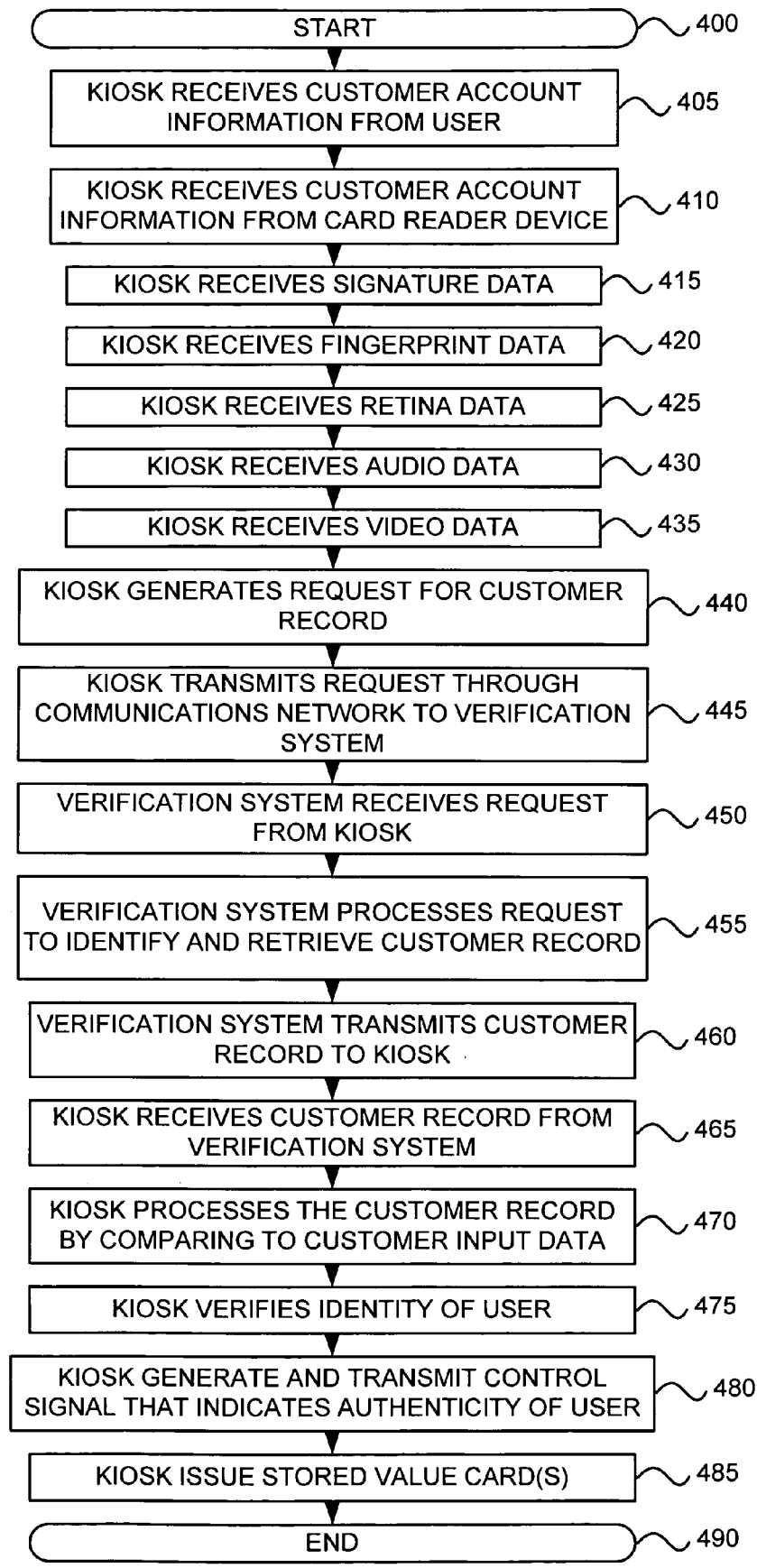
FIG. 4 is a flowchart for identifying and verifying the identity of a user of a kiosk with the kiosk performing a comparison in an exemplary implementation of the invention.

FIG. 4 is a flow chart for identifying and verifying the identity of the user of the kiosk with the kiosk performing a comparison in another exemplary implementation of the invention. In FIG. 4, the kiosk 100 generates an identification query that requests one or more customer records from an external verification system 220 in order to process the verification of the identity of the user within the kiosk 100. In FIG. 5, which will be discussed below, the kiosk 100 generates an identification query that includes at least some customer input data for the purpose of processing the verification of the identity of the user at the external verification system 220. Once the process is completed and a determination is made, the external verification system 220 then transmits a verification response back to the kiosk 100.

FIG. 4 begins in step 400. In step 405, the kiosk 100 receives customer input data from the user. An example of the kiosk 100 receiving customer input data includes the processor 150 directing the I/O interfaces 110 to receive customer account information. In this example, the I/O interfaces 110 may receive customer input data through one or a combination of the following: the audio interface 112, the video interface 114, or the keypad 118. In another example, the kiosk 100 receiving customer input data includes the processor 150 directing the card reader 120 to read a card and receive customer input data. In another example, the kiosk 100 receives customer account information from the I/O interfaces 110 while the biometric capture system 180 receives biometric data.

In step 410, the kiosk 100 receives signature data as a part of the customer input data. An example of the kiosk 100 receiving signature data includes the processor 150 directing the signature capturing device 182 to scan and receive an image of a signature of the user of the kiosk 100. In step 415, the kiosk 100 receives fingerprint data as a part of the customer input data. An example of receiving fingerprint data includes the processor 150 directing the fingerprint capturing device 184 to scan and receive an image of a fingerprint of the user of the kiosk 100. In step 420, the kiosk 100 receives retina data as a part of the customer input data. An example of receiving retina data includes the processor 150 directing the retina capturing device 186 to scan and receive an image of an eye of the user of the kiosk 100. In step 425, the kiosk 100 receives audio data as a part of the customer input data. An example of receiving audio data includes the processor 150 directing the audio capturing device 188 to record and receive an audio sample of the user of the kiosk 100. In step 430, the kiosk 100 receives video data as a part of the customer input data. An example of receiving video data includes the processor 150 directing the video capturing device 190 to scan and receive an image of the user of the kiosk 100. The process of validating the identity of the user of the kiosk based on biometric data is described in further detail in U.S. application Ser. No. 10/966,299 entitled "Systems and Methods for Biometric Identification and Verification of a User of a Kiosk" filed on Oct. 15, 2004, which is hereby incorporated by reference.

In step 435, the kiosk 100 generates an identification query comprising a request for a customer record and at least some customer input data. In step 440, the kiosk 100 transmits the identification query to the external verification system 220. In one embodiment, the processor 150 directs the communications network interface 170 to transmit the identification query over the external communication link 172 through a communication network 210.

In step 445, the external verification system 220 receives the identification query. In one embodiment, the identification query will be received by one or a combination of the following: the card transaction processing system 230, the government database 240 or the member bank system 250. Those skilled in the art will understand that there may be numerous card transaction processing systems 230, government databases 240, and member bank systems 250 which may receive the identification query.

In step 450, the external verification system 220 processes the identification query to identify and retrieve the correct customer record. A possible example would include the external verification system 220 processing the available customer input data which was received from the kiosk 100 and then determining a matching customer record. Another example would include the government database 240 processing the customer input data received from the kiosk 100 and then determining if there is a match of customer records with suspected criminal activity. In another example, the member bank system 250 may process the identification query and identify a customer record from at least some customer input data that matches existing accounts.

In step 455, the external verification system 220 transmits the selected customer record back to the kiosk 100. In one embodiment, the customer record will travel through a communication network 210 to the kiosk 100. In another embodiment, multiple customer records from one or a combination of the following may be sent to the kiosk 100: the card transaction processing system 230, the government database 240 or the member bank system 250.

In step 460, the kiosk 100 receives the verification response including the requested customer record from the external verification system 220. In one embodiment, the kiosk 100 may receive multiple customer records. In step 465, the kiosk 100 processes the customer record to compare the customer input data to the customer record in order to verify the identity of the user of the kiosk. In one embodiment, the customer account information may be compared with the customer record. In another embodiment, biometric data may be compared with the customer record. In another embodiment, customer account and/or biometric data may be compared with multiple customer records retrieved from one or a combination of the following: the card transaction processing system 230, the government database 240, or the member bank system 250.

In step 470, the kiosk 100 generates and transmits a control signal that indicates the authenticity of the user of the kiosk 100. In step 475, the kiosk 100 issues stored-value cards. In other examples, the kiosk 100 may issue credit, charge or debit cards. In another example, the kiosk 100 may issue a money order, draft, check or financial instrument. A stored-value card is any card that is associated with a stored-value account. A stored-value account is an account that contains monetary value and does not require a bank account, such as a demand deposit account (DDA), or a credit line. The process of issuing stored-value cards to a user of the kiosk 100 is described in further detail in U.S. application Ser. No. 10/966,879 entitled "Systems and Methods for Banking Transactions using a Stored-Value Card" filed on Oct. 15, 2004, which is hereby incorporated by reference. In an example, the processor 150, based on the comparison of at least some customer input data and the customer record, may generate and transmit a control signal that would direct the card and materials dispenser 146 to dispense stored-value cards from the card inventory 142 as well as printed material from the printed materials inventory 144. The process of money sharing with multiple stored-value cards is described in further detail in U.S. application Ser. No. 10/966,958 entitled "Systems and Methods for Money Sharing" filed on Oct. 15, 2004, which is hereby incorporated by reference. Further, based on the control signal, the processor 150 may direct the printer 116 to print a receipt. FIG. 4 ends in step 480.

Figure 5:
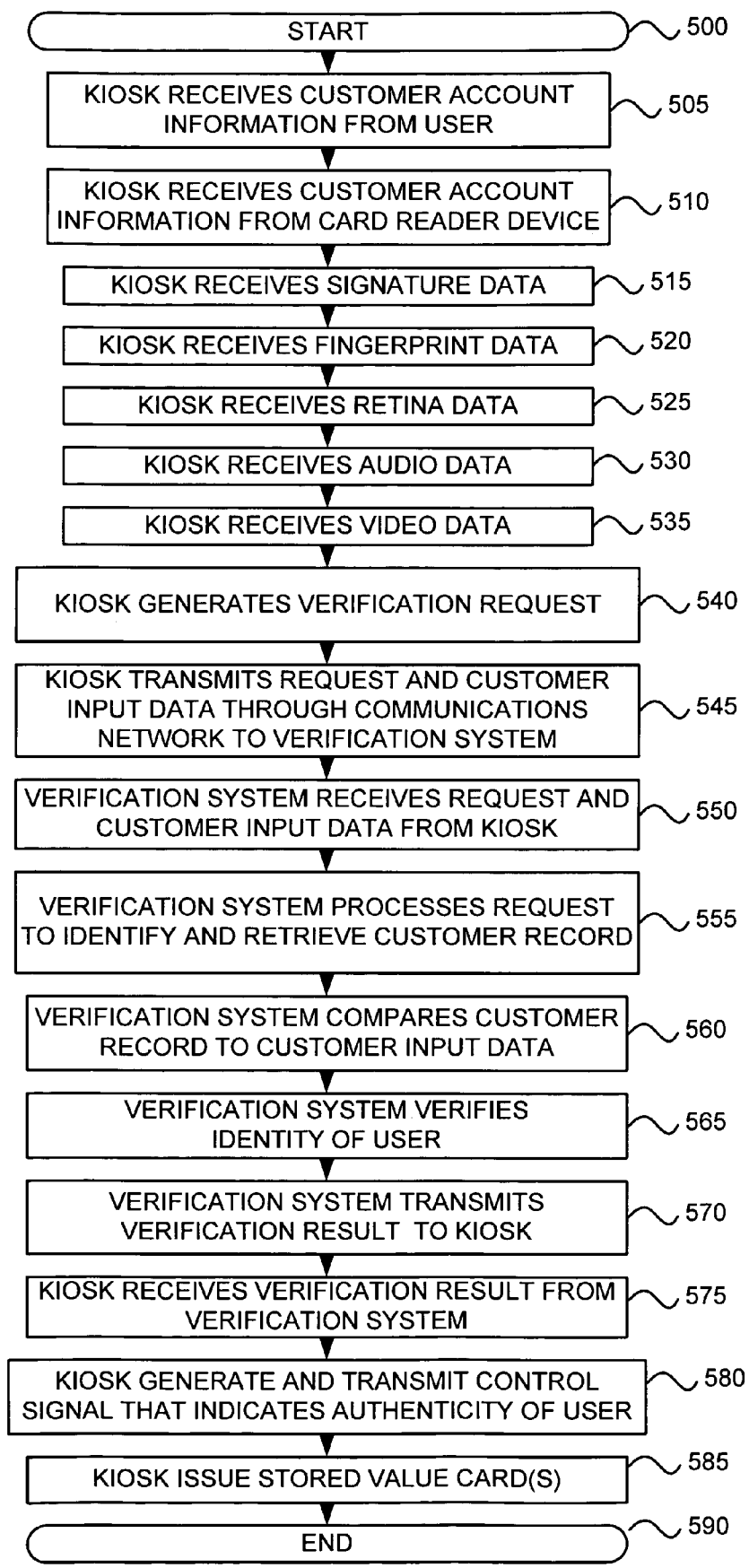
FIG. 5 is a flowchart for identifying and verifying the identity of a user of a kiosk with the external verification system performing a comparison in an exemplary implementation of the invention.

FIG. 5 is a flowchart for identifying and verifying the identity of the user of the kiosk with the external verification system performing a comparison in another exemplary implementation of the invention. FIG. 5 begins in step 500. In step 505, the kiosk 100 receives customer input data from the user. In step 510, the kiosk 100 receives signature data as a part of the customer input data. In step 515, the kiosk 100 receives fingerprint data as a part of the customer input data. In step 520, the kiosk 100 receives retina data as a part of the customer input data. In step 525, the kiosk 100 receives audio data as a part of the customer input data. In step 530, the kiosk 100 receives video data as a part of the customer input data. In step 535, the kiosk 100 generates an identification query comprising a request to verify at least some customer input data. In step 540, the kiosk 100 transmits the identification query through the communication network 210 to the external verification system 220.

In step 545, the external verification system 220 receives the identification query. In step 550, the external verification system 220 processes the identification query to identify and retrieve the correct customer record.

In step 555, the external verification system 220 processes the customer record to compare at least some of the customer input data to the customer record to verify the identity of the user of the kiosk and create a verification result. In one embodiment, the customer account information may be compared with the customer record. In another embodiment, biometric data may be compared with the customer record. In another embodiment, customer account and/or biometric data may be compared with multiple customer records in one or more of the following: the card transaction processing system 230, the government database 240, or the member bank system 250. In this embodiment, the card transaction processing system 230 collects the verification results from the government database 240 and member bank system 250. The card transaction system 230 may further process the verification results in order to make a final verification result determination and then send the final verification result determination to the kiosk 100.

In step 560, the external verification system 220 transmits a verification response that includes the verification result back to the kiosk 100. In one embodiment, the verification response will travel through a communication network 210 to the kiosk 100. In step 565, the kiosk 100 receives the verification response that includes the verification result from the external verification system 220. In step 570, the kiosk 100 generates and transmits a control signal that indicates the authenticity of the user of the kiosk 100. In step 575, the kiosk 100 issues stored-value cards. FIG. 5 ends in step 580.

The above-described functions can be comprised of instructions that are stored on storage media. The instructions can be retrieved and executed by the processor 150. Some examples of instructions are software, program code, and firmware. Some examples of storage media are memory devices, tape, disks, integrated circuits, and servers. The instructions are operational when executed by the processor 150 to direct the processor 150 to operate in accord with the invention. Those skilled in the art are familiar with instructions, processor(s), and storage media.

Those skilled in the art will appreciate variations of the above-described embodiments that fall within the scope of the invention. As a result, the invention is not limited to the specific examples and illustrations discussed above, but only by the following claims and their equivalents.

What is claimed:

1. A kiosk that provides financial services, the kiosk comprising:
an I/O interface configured to receive customer input data;
a processor coupled to the I/O interface and configured to generate an identification query which includes at least some of the customer input data, transmit the identification query to an external verification system, receive a verification response from the external verification system, and process the verification response to verify the identity of the user of the kiosk; and
a card and materials dispenser configured to issue a financial account card to the user of the kiosk,
wherein the processor is further configured to perform a statistical algorithm to determine the probability of the identity of the user of the kiosk.

2. The kiosk of claim 1 wherein the customer input data comprises customer account information.

3. The kiosk of claim 1 wherein the verification response comprises a customer record.

4. The kiosk of claim 3 wherein the processor is further configured to compare the customer record with the customer input data to verify the identity of the user of the kiosk.

5. The kiosk of claim 1 wherein the verification response comprises a verification result.

6. The kiosk of claim 5 wherein the processor is further configured to determine the verification result to verify the identity of the user of the kiosk.

7. The kiosk of claim 1 wherein the customer input data comprises biometric data.

8. The kiosk of claim 7 wherein the biometric data comprises a scanned image of a user's signature.

9. The kiosk of claim 7 wherein the biometric data comprises a scanned image of a user's fingerprint.

10. The kiosk of claim 7 wherein the biometric data comprises a scanned image of a user's eye.

11. The kiosk of claim 7 wherein the biometric data comprises a recorded audio sample of the user of the kiosk.

12. The kiosk of claim 7 wherein the biometric data comprises a video image of the user of the kiosk.

13. The kiosk of claim 1 wherein the identification query comprises a request for a customer record.

14. The kiosk of claim 1 wherein the processor is further configured to generate and transmit a control signal that indicates an authenticity of the user of the kiosk based on the verification.

15. The kiosk of claim 1 wherein the financial account card is a stored-value card.

16. The kiosk of claim 1 wherein financial account card is a credit card.

17. The kiosk of claim 1 wherein the financial account card is a debit card.

18. The kiosk of claim 1 wherein the financial account card is a financial instrument.

19. The kiosk of claim 1 wherein the processor is further configured to display customer input data to an agent located in a call center.

20. A financial system that identifies and verifies an identity of a user of a kiosk that provides financial services, the external verification system comprising:
a kiosk configured to receive customer input data, generate an identification query which includes at least some of the customer input data, transmit the identification query to an external verification system, receive a verification response from the external verification system, process the verification response to verify the identity of the user of the kiosk, perform a statistical algorithm to determine the probability of the identity of the user of the kiosk, and provide a financial account card to the user of the kiosk based on the whether the user identify is verified, wherein the external verification system is further configured to receive an identification query including user account data, access user data from a remote service, and compare the user account data with the user data from the remote, and
the external verification system configured to receive the identification query from the kiosk which includes at least some customer input data, process the identification query to generate the verification response for verifying the identity of the user of the kiosk, and transmit the verification response for verifying the identity of the user to the kiosk that provides financial services.

21. The financial system of claim 20 wherein the customer input data comprises customer account information.

22. The financial system of claim 20 wherein the verification response comprises a customer record.

23. The financial system of claim 22 wherein the kiosk is further configured to compare the customer record with the customer input data to verify the identity of the user of the kiosk.

24. The financial system of claim 20 wherein the verification response comprises a verification result.

25. The financial system of claim 24 wherein the kiosk is further configured to determine the verification result to verify the identity of the user of the kiosk.

26. The financial system of claim 20 further comprising:
the external verification system further configured to receive the identification query from the kiosk, process the identification query to generate a verification response for identifying the user of the kiosk; and transmit the verification response for identifying the user from the external verification system to the kiosk.

27. The financial system of claim 20 wherein the customer input data comprises biometric data.

28. The financial system of claim 20 wherein the identification query comprises a request for a customer record.

29. The financial system of claim 20 wherein the kiosk is further configured to generate and transmit a control signal that indicates an authenticity of the user of the kiosk based on the verification.

30. The financial system of claim 20 wherein the financial account card is associated with a non-banking financial account.

31. The financial system of claim 20 wherein the remote service is a credit reporting service.

32. The financial system of claim 20 wherein the kiosk is further configured to receive a photo identification card associated with the user, scan the photo identification card, obtain an image of the user, and verify the identify of the user by comparing the obtained user image with the results of the scanned photo identification card.

33. The financial system of claim 20 wherein the kiosk is further configured to display customer input data to an agent located in a call center.

34. A kiosk that provides financial services, the kiosk comprising:
an I/O interface configured to receive customer input data; and a processor coupled to the I/O interface and configured to generate an identification query which includes at least some of the customer input data, transmit the identification query to an external verification system, receive a verification response from the external verification system, and process the verification response to verify the identity of the user of the kiosk, wherein the external verification system is configured to receive an identification query including user account data, access user data from a remote service, and compare the user account data with the user data from the remote, and wherein the kiosk is configured to receive a photo identification card associated with the user, scan the photo identification card, obtain an image of the user, and verify the identify of the user by comparing the obtained user image with the results of the scanned photo identification card.

35. The financial system of claim 34, wherein the external verification system is further configured to receive an identification query including user account data, access user data from a remote service, and compare the user account data with the user data from the remote.

36. The financial system of claim 34, wherein the remote service is a credit reporting service.

\* \* \* \* \*